United States Patent [19]

Cannalire et al.

[11] Patent Number: 5,414,766
[45] Date of Patent: May 9, 1995

[54] PROCESS AND DEVICE FOR ADAPTIVE DIGITAL CANCELLATION OF THE ECHO GENERATED IN TIME-VARYING TELEPHONE CONNECTIONS

[75] Inventors: Giacomo Cannalire, Cassano D'Adda; Luigi Morini, Cervesina, both of Italy

[73] Assignee: Siemens Telecomunicazioni S.p.A., Milan, Italy

[21] Appl. No.: 21,522

[22] Filed: Feb. 23, 1993

[30] Foreign Application Priority Data

Feb. 24, 1992 [IT] Italy ................................. MI92A0398

[51] Int. Cl.$^6$ ............................................. H04M 9/08
[52] U.S. Cl. ................................... 379/410; 379/406; 379/411; 379/345; 370/32.1
[58] Field of Search ............... 379/406, 407, 408, 410, 379/411, 345; 370/32.1

[56] References Cited

U.S. PATENT DOCUMENTS

| | | |
|---|---|---|
| 4,736,414 | 4/1988 | Montagna et al. |
| 4,813,073 | 3/1989 | Ling ................................. 379/410 |
| 4,887,258 | 12/1989 | Belloc et al. .................... 379/410 X |
| 4,965,786 | 10/1990 | Salle ................................ 379/411 X |
| 5,132,963 | 6/1992 | Ungerboeck .................... 379/410 X |

FOREIGN PATENT DOCUMENTS 0375015 6/1989 European Pat. Off.

OTHER PUBLICATIONS

"Digital Signal Processing Theory, Application, And Hardware", by R. A. Haddad et al, pp. 203–212.
"Digital Processing of Signals, Theory and Practice", by M. Bellanger, Book by John Wiley & Sons, pp. 298–300.

Primary Examiner—James L. Dwyer
Assistant Examiner—Paul A. Fournier
Attorney, Agent, or Firm—Hill, Steadman & Simpson

[57] ABSTRACT

An echo cancellation device usable in telephone connections affected by phase-roll is described. The canceller calculates the echo path propagation delay and produces an estimate of the echo signal by digitally filtering the signal originated by the far-end talker. The echo estimate is then subtracted from the actual echo to eliminate listening disturbances. The filter used is of the FIR type with adaptive coefficients updated iteratively by adding algebraically, to the values which they had upon the preceding iteration, a correction term proportional to the estimate error. The frequency of the coefficient updating iterations is a multiple of the rate $f_c$ of acquisition of the voice and echo samples by the canceller.

20 Claims, 4 Drawing Sheets

PROCESS AND DEVICE FOR ADAPTIVE DIGITAL CANCELLATION OF THE ECHO GENERATED IN TIME-VARYING TELEPHONE CONNECTIONS

BACKGROUND OF THE INVENTION

The present invention relates to the field of signal transmission on telephone lines and in particular to a procedure and device for adaptive digital cancellation of the echo generated in non-constant telephone connections.

It is known that in long distance telephone connections there can occur voice signal reflections toward the same subscriber who generated them. This is due mainly to the impedance mismatch of the hybrid coils placed between the 4-wire lines and 2-wire lines to which lead the two telephones placed at the two ends of the connection. Because of the reflections, a subscriber, while he is still talking, listens to what he said with a delay depending on the length of the connection. The signal fraction listened to is the echo of the signal transmitted, and the path the echo completes, from the point of generation to the point of listening, is called an echo channel.

It has been proven that the effects of the echo are annoying for delays over a few tens of milliseconds, and echo channel attenuations between 6 dB and 15 dB. To obviate this drawback, in long distance telephone connections appropriate correction devices called echo cancellers are adopted.

These devices are generally inserted in 4-wire lines connected to an international exchange and suppress the echo produced during the conversation by subtracting from the actual echo signal an estimate thereof obtained by means of a digital filter with adaptive coefficients which again copies the pulse response of the echo channel.

In known echo cancellers there is also generally present a non-linear circuit which entirely eliminates the echo residue when it is less than a predetermined threshold. In addition they are equipped with a double-talking detector circuit which, in the presence of speech of a near-end talker, inhibits both updating of the transverse filter coefficients and operation of the non-linear circuit so that it does not attenuate the speech.

As is known, the echo channel can have a transfer function which is not constant in time. In this case its pulse response becomes a function variable in time and can significantly influence the performance of the canceller.

This phenomenon occurs in FDM-SSB-SC systems with a single physical communication path which transmit in both directions using carriers with different frequencies.

The modulation and demodulation frequencies of the carrier system are not synchronized, being locally generated. This can cause translation of all the echo signal frequency components with respect to the signal sent. This phenomenon, called phase-roll, causes the non-constant nature of the echo channel.

International guide-lines in this matter are set for example by CCITT G.311 recommendations which require that the frequency shift between the two ends of a connection must not exceed 2 Hz in each direction. Consequently the upper limit for total frequency shift on the echo path is 4 Hz.

A first known echo canceller intended to solve the problems of echo cancellation in connections of any distance affected by phase-roll is the one based on a procedure described in the Italian patent application no. 68047-A/83, inventors R. Montagna and L. Nebbia, filed in the name of CSELT on 12 Oct. 1983 (corresponding to U.S. Pat. 4,736,414). This canceller benefits from the fact that the pulse responses of the echo channels are characterized by a pure propagation delay followed by a zone approximately 6 ms wide in which the pulse response is significantly different from zero. Consequently, in accordance with the above procedure, evaluation is made of the signal propagation delay, for the purpose of adopting a short transverse filter whose coefficients correspond only to the significant part of the pulsed response. The filter used is the non-recursive type (FIR) with adaptive coefficients updated by the gradient method.

The limited number of coefficients to update makes the canceller faster in producing the echo estimate, allowing its use even in connections affected by limited phase-roll.

Even though the canceller mentioned above has better performance than the previous ones in connections affected by phase roll, it is not capable of maintaining good operational performance in the presence of sustained phase roll, e.g. on the order of 4 Hz. A second known echo canceller is the one described in the text of Italian patent no. 1228106, inventors Giacomo Cannalire, Giacomo Premoli and Roberto Ravasio, issued 28 May 1991 and filed 21 Dec. 1988 in the name of the same applicant (corresponding to U.S. Ser. No. 07/870,179 filed Apr. 16, 1992). The canceller described therein allows for the echo signal propagation delay to limit the pulse response estimate of the echo channel to only the significant part thereof, similarly to what was done in the Nebbia-Montagna canceller, differentiating itself from it and from the majority of known echo cancellers by the fact that it uses a recursive digital filter of the IIR type with adaptive coefficients. The latter are updated by means of an algorithm obtained by innovatively simplifying the conventional Kalman algorithm. As known, the Kalman algorithm possesses a considerable convergence speed but requires a considerable number of arithmetic operations. The innovative simplification was to divide the calculations for a generic iteration of the algorithm on several sampling intervals with a criterion called square error decimation. Decimation reduces the algorithm convergence speed, which however remains more than sufficient to compensate for a 4 Hz phase roll but also allows reduction of the number of arithmetic operations assigned to each sampling interval.

In comparison with earlier ones, this canceller shows clearly superior performance in connections affected by phase-roll up to 4 Hz. On the other hand, the complexity of the calculation due to the greater complexity of Kalman's algorithm compared with the gradient method is still considerable.

SUMMARY OF THE INVENTION

Therefore the purpose of the present invention is to overcome the above drawbacks and provide a process and device for echo cancellation generated in non-constant telephone connections such as, for example, those affected by phase-roll.

The process comprises a first phase in which is completed an estimate of the echo signal propagation delay, identifying in the pulse response of the echo channel the beginning point of the part significantly different from zero of this response. In a second phase, the significant part of the pulse response is simulated by a non-recursive digital filter with adaptive coefficients, characterized by a finite pulse response (FIR) whose input receives voice samples of the far-end talker appropriately delayed by the propagation delay, and at whose output is present an estimated echo which is subtracted from the actual echo to eliminate the bothersome effects for the listener. The filter coefficients are updated iteratively by adding algebraically, to the values they had upon the preceding iteration, a correction term proportional to the error in the echo estimate. The frequency of the updating iterations is a multiple of that of acquisition of the voice and echo samples by the canceller. The coefficient adaptation algorithm implemented in the echo cancellation procedure which is the object of the present invention is an innovative application of the traditional gradient method used in known echo cancellers. This innovative application, referred to below as "coefficient calculation method by error interpolation", allows greater convergence speed in the calculation of coefficients than the traditional gradient method. Therefore the echo canceller achieved in accordance with the procedure which is the object of the present invention is capable of operating while maintaining good performance even in the presence of a 4 Hz phase-roll.

It is necessary to specify that the higher convergence speed is achieved at the expense of an increase in the number of arithmetic operations completed at each interval of acquisition of the voice and echo samples, compared to the number of operations completed in the same period by the traditional gradient method. However, given the simplicity of the calculations performed for each iteration, the added complexity does not introduce appreciable drawbacks. Indeed, it is possible to implement more echo cancellers operating in accordance with the process which is the object of the present invention, by using a single microprocessor specialized in the processing of digital signals.

To attain these results the present invention has for its object a process and a device for adaptive digital cancellation of the echo generated in non-constant telephone connections.

In general terms the present invention is a process for adaptive digital cancellation of the echo generated in time-varying telephone connections. The inventive process has the following phases: estimate of the pure propagation delay existing between a voice signal of a far-end talker and an echo signal produced by reflection of the voice signal toward the far-end talker, a temporal variable of the voice and echo signals being discretized at the sampling frequency of the voice and echo signals; non-recursive digital filtering with adaptive coefficients of the voice samples of the far-end talker delayed by the value of the propagation delay for generation of samples of an estimated signal of the echo signal; subtraction of the estimated signal from the echo signal to obtain an echo residual signal sent to the far-end talker without the effects due to the echo signal; adaptive coefficients iteratively updated by adding algebraically upon each iteration, to the value they had upon an immediately preceding iteration, an appropriate correction term proportional to the value of the echo residual signal calculated upon the present iteration; and frequency of the updating iterations of the coefficients having a value which is a multiple of the sampling frequency.

In general terms the invention is also an echo canceller for the echo generated in time-varying telephone connections, comprising: means which estimate the propagation delay between a voice signal generated by a far-end talker and an echo signal produced by reflection of the voice signal toward the far-end talker, a temporal variable of the voice and echo signals being discretized at the sampling frequency of the voice and echo signals; means generating an input vector comprising a number of voice samples of the far-end talker having a temporal variable equal to the temporal variable of the voice and echo signals less the propagation delay; means generating an adaptive coefficient vector having a predetermined number of coefficients, and iteratively updating this vector by adding algebraically to each iteration at the value which it had for a previous iteration an appropriate correction term proportional to the value of an echo residual signal calculated at the present iteration; non-recursive digital filtering means producing a sequence of samples of a signal estimate that is calculated by multiplying the transposed coefficient vector by the input vector; subtraction means subtracting the samples of the signal estimate from those of the echo signal to obtain samples of a echo residual signal sent to the far-end talker without the effects due to the echo signal; and timing means generating a timing signal having a frequency which is a multiple of a value of the sampling frequency, the timing signal controlling the updating iterations of the coefficient vector.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
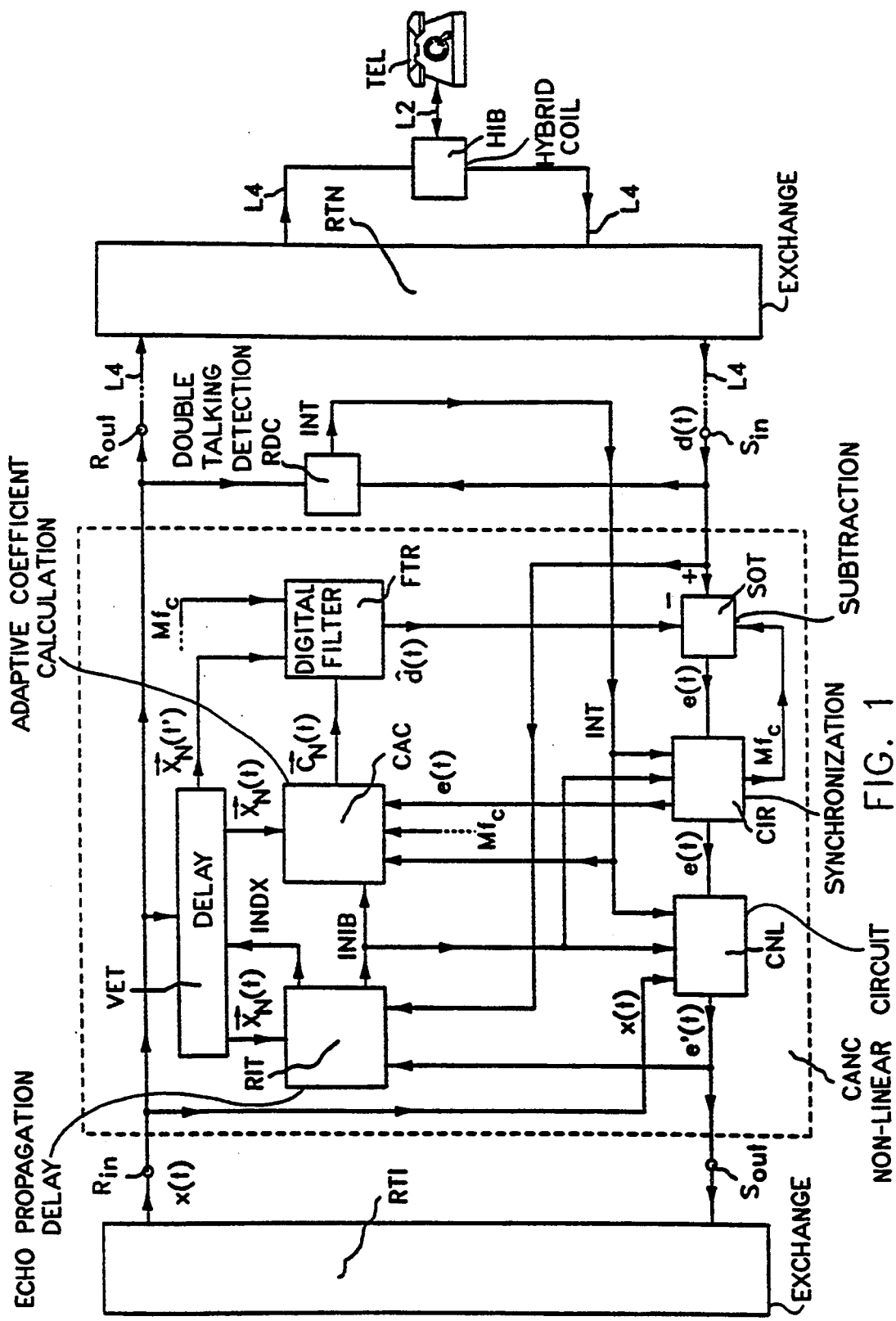
FIG. 1 is a functional block diagram of the echo canceller of the present invention.

With reference to FIG. 1 may be seen an echo canceller CANC which is the object of the present invention located near an international telephone exchange RTI and placed in series with a 4-wire telephone line which connects the exchange to a national exchange RTN.

The 4-wire line L4 is connected, through the exchange RTN, to a hybrid coil HIB which in turn is connected to a telephone TEL by a 2-wire line L2.

The echo canceller CANC has four terminals designated $R_{in}$, $R_{out}$, $S_{in}$ and $S_{out}$ having the following meanings:

the terminal $R_{in}$ is the input of a signal x(t) which represents the voice of the far-end talker (i.e. the talker at the other end of the connection from the telephone TEL);

the terminal $R_{out}$ is the output of the signal x(t);

the terminal $S_{in}$ is the input of a signal d(t) which can be either the voice of the near-end talker (the one talking on the telephone TEL) or the echo of the signal x(t), or the overlapping of the two;

the terminal $S_{out}$ is the output of a signal $e'(t)$ which represents either the voice of the near-end talker or, as will be better explained below, a residual echo of the signal $x(t)$.

In the case under examination all the signals indicated in the figures are digital and therefore, for the sake of brevity, the indication of the respective analog-digital converters has been omitted. In addition the temporal variable t is a discrete variable which undergoes increments of 125 μs, each equal to the period P of the sampling frequency $f_c$ (8 kHz) of the signals $x(t)$ and $d(t)$.

The figures show a canceller CANC which interfaces the international telephone exchange RTI with the 4-wire line L4. More specifically, the terminals $R_{in}$ and $S_{out}$ of the canceller CANC are connected to the telephone exchange RTI. The terminal $R_{out}$ is connected to a first wire of the line L4 which extends to the reception input of the exchange RTN. The terminal $R_{out}$ is also connected to a first input of a double talking or speech detection block RDC which can also be considered as being a part of the canceller CANC.

The terminal $S_{in}$ of CANC is connected to a second wire of the line L4 which comes from the transmission side of the exchange RTN. The terminal $S_{in}$ is also connected to a second input of block RDC.

The echo canceller CANC is functionally divisible in the following blocks:

a non-recursive digital filter FTR with adaptive coefficients which produces an estimate signal $\hat{d}(t)$ of the echo $d(t)$;

a block CAC which calculates the adaptive coefficients of the filter FTR by means of an appropriate adaptation algorithm;

a subtractive block SOT which subtracts the estimated echo from the actual echo to obtain an error signal $e(t)=d(t)-\hat{d}(t)$ also called residual echo;

a block CIR which appropriately synchronizes blocks CAC, FTR and SOT to allow interpolation of the error $e(t)$ in calculating the adaptive coefficients of the filter;

a block RIT which calculates the echo propagation delay $d(t)$, where by propagation delay is meant the total delay between the signal $x(t)$ at the output $R_{out}$ of the canceller and the signal $d(t)$ at its input $S_{in}$;

a block VET which appropriately delays the voice signal of the far-end talker to compensate for the echo path delay;

and a block CNL designated non-linear circuit which can be considered a special case of echo suppressor accomplished in accordance with known techniques.

As mentioned above, the blocks of FIG. 1 represent primarily a functional diagram of the canceller, whereas in reality these are parts of a microprocessor program used to implement the canceller which is the object of the invention. The microprocessor used is, for example, the AT&T WE ® DSP16A which operates with fixed-point on 16-bit operands and a instruction cycle of 34 ns. This microprocessor is very suitable for the purpose and, indeed, it comprises a parallel multiplier with 16 bit input and 32 bit output and an adder with two 32 bit inputs and 36 bit output. These circuits allow completion of a multiplication and an addition in a single instruction cycle. It also comprises a RAM, a ROM and appropriate input/output registers of serial data. A clock signal and a frame synchronizing signal, not visible in the figures, reach the microprocessor to synchronize internal and input/output operations of the PCM samples.

In accordance with the foregoing, the terminals $R_{in}$ and $S_{in}$, omitting for the sake of simplicity the analog/digital converters, are directly connected to respective serial input ports of the microprocessor. Similarly, the terminals $R_{out}$ and $S_{out}$, omitting the digital/analog converters, are connected to respective serial output gates of the microprocessor.

The voice signal $x(t)$, coming from the exchange RTI, reaches the terminal $R_{in}$ and then a first input of blocks VET and CNL.

Block VET organizes the voice samples $x(t)$ in a vector of N dimensions $\bar{X}_N(t)$, called hereinafter input signal vector, made available at a first and at a second output. The vector present at the first output reaches a first input of block RIT which uses it for calculating the echo propagation delay.

The echo signal $d(t)$ coming from the exchange RTN reaches the terminal $S_{in}$ and then a first input of block SOT indicated in the figures by the symbol (+) and a second input of block RIT which uses it to calculate the propagation delay. After completion of the calculation, at a first output of block RIT is present a signal INDX which represents the propagation delay expressed as a number of 125 μs intervals. The signal INDX is directed to a second input of block VET which uses it to calculate a vector $\bar{X}_N(t')$ made available at a third output, which differs from the vector $\bar{X}_N(t)$ in that the voice samples of the far-end talker are delayed by a time $t'=t-\text{INDX}$. The vectors $\bar{X}_N(t)$ and $\bar{X}_N(t')$ are stored in respective shift registers belonging to block VET and implemented by using consecutive appropriately addressed RAM cells of the microprocessor.

At the output of block FTR is present the echo estimated signal $\hat{d}(t)$ which reaches a second input of block SOT indicated in the figures by the symbol (−).

At the output of block SOT is present the error signal $e(t)$ which reaches a first input of block CIR and then is transferred to a first or a second output of this block depending on the occurrence of appropriate conditions, as will be better explained below.

The first output and the second output of block CIR are connected to a first input of block CAC and a second input of block CNL respectively.

To a first input of block FTR, a plurality of signals is connected, coming from the output of block CAC, indicated in the figures by the vectorial symbol $\bar{C}_N(t)$. This plurality comprises a number N of adaptive coefficients of the filter FTR and therefore $\bar{C}_N(t)$ is denominated coefficient vector of the filter FTR.

To a second input of blocks CIR and CAC and to a third input of block CNL a first inhibition signal INT is brought coming from a first output of block RDC.

The signal $e'(t)$, coming from the output of block CNL, reaches a third input of block RIT and the terminal $S_{out}$ of CANC. At a second output of block RIT is present a second inhibition signal INIB directed toward a third input of blocks CAC and CIR and toward a fourth input of block CNL. To a fourth input of block CAC, coming from the second output of block VET, reaches the vector of the input signal $\bar{X}_N(t)$. To a second input of block FTR, coming from the third output of block VET, reaches the vector $\bar{X}_N(t')$. Finally a timing signal $Mf_c$ departs from a third output of a block CIR directed toward a third input of block SOT, a third input of block FTR and a fifth input of block CAC respectively.

In operation, the echo canceller CANC can be in one of the following states, indicated for convenience by the letters T, A, X, Y and W. State T is an initialization and calculation phase of the echo path delay. State A characterizes operation in the presence of voice of the far-end talker only, with the echo canceller already at steady state. State X characterizes operation in the absence of both talkers. The presence of only the near-end talker characterizes state Y and the double talking state W.

The canceller enters into the initialization phase (state T) upon occurrence of each new connection between two telephones which lead to the exchanges RTI and RTN respectively. In this phase the block RIT, in the presence of voice of the far-end talker only, calculates the propagation delay of the actual echo signal d(t).

The calculation is performed by a process of correlation between the voice samples x(t) of the far-end talker and the actual echo samples d(t). This correlation process determines the point of greatest similarity between these two signals, identifying in this manner the propagation delay as is better explained below.

During calculation there is sent to block CAC signal INIB which zeroes the coefficients of the filter FTR, an operation equivalent to the zeroing of the pulsed response. Therefore, in the presence of INIB it will be $\hat{d}(t)=0$. When the calculation is complete, block RIT removes the signal INIB and sends to block VET the signal INDX. At this point the canceller goes through a transitory phase which brings it toward the steady state operation at rated speed which characterizes state A. Previous zeroing of the coefficients of FTR is necessary because, if they are not zeroed, the convergence time of the adaptation algorithm would undergo an extension which would consequently delay the reaching of the steady state A. In addition, when the canceller is in the steady state A, block RIT keeps under constant observation the echo residual e'(t) output from block CNL. If it exceeds a certain preset threshold, block RIT recalculates the propagation delay INDX because it has very probably changed considerably.

Now let us examine the operation of the canceller in state A. In this operation state the disabling signals INT and INIB are not generated and therefore all blocks are operating.

As mentioned above, the hybrid coil HIB reflects a fraction of the signal x(t) on the line L4 again toward the exchange RTN. This signal fraction reaches the terminal $S_{in}$ of the echo canceller CANC and it is indicated in the figures as the echo signal $\hat{d}(t)$.

The filter FTR performs the estimate d(t) of the echo $\hat{d}(t)$ and sends it to the subtractor SOT which in turn subtracts it from the actual echo d(t) to obtain the error signal e(t)=d(t)−d(t), also termed "echo residual".

Block CIR synchronizes the operation of blocks FTR, CAC and SOT in order to generate a timing signal $Mf_c$ with frequency equal to $M \cdot f_c$, where $f_c = 8$ kHz is the sampling frequency of signals x(t) and d(t), and M is an integer >1 appropriately selected and termed interpolation factor of the error e(t).

The expression "error interpolation" means that the calculation of the error e(t) in the estimate of the echo is done M times during the sampling interval of 125 $\mu$s. Therefore in the context of the canceller which is the object of the present invention, the meaning of the interpolation is different from the known meaning in the field of digital signals. This operation of interpolation of known type is described, for example, on pages 203 to 212 of the volume entitled 'Digital signal processing' by Haddad and Parsons published by Computer Science Press in 1991.

The operating sequence of blocks FTR, CAC and SOT is as follows: initially the filter FTR calculates a new estimated echo sample $\hat{d}(t)$; then block SOT subtracts from the actual echo sample d(t) the estimated echo sample d(t) to obtain an error sample e(t); lastly the sample e(t) is sent to the block CAC to update the vector of the coefficients $\bar{C}_N(t)$.

In view of the above, it can be deduced that blocks CIR, CAC, FTR and SOT constitute a sort of interpolation loop operating M times faster than the remaining blocks of CANC, which must respect the rate of the voice samples x(t) at the terminal $R_{in}$ and that of the associated echo samples e(t) at the terminal $S_{in}$. The complexity of calculation, understood as the number of arithmetical operations performed in the sampling period, is increased by M times that of a canceller not completing this interpolation, in return an M times increase in the convergence speed of the calculation algorithm is obtained.

Block CIR, to operate, uses an index j counter zeroed at the beginning of each frame of 125 $\mu$s and increased each 125/M $\mu$s by the timing signal $Mf_c$. This counter counts the number of iterations of each interpolation cycle of the error consisting of M iterations and therefore is called hereinafter "iteration counter". This counter is implemented by software, as is the generation of the signal $Mf_c$. In practice the error interpolation loop corresponds to a program routine, as is better illustrated below.

After each increase of index j, block CIR performs a test on the value reached thereby. Each time the result is j≠M a new sample of the signal e(t) is sent on the first output connected to block CAC. But when the condition j=M occurs the sample of e(t) is sent both to block CAC, which completes the last updating iteration of the vector $\bar{C}_N(t)$, and to the second output connected to block CNL.

Since for j=M the echo residual e(t) is sent to the output of the canceller CANC, the present cycle of interpolation of the error e(t) is completed. Calculation of the echo estimated d(t) will be made in the next interpolation cycle using a new echo sample $\hat{d}(t)$ and an input vector $\bar{X}_N(t')$ updated with a new sample X(t').

Block CNL is a silencing device for the echo residual which compares the echo residual samples e(t) with a threshold value which depends on the level of the signal x(t). If from the comparison e(t) exceeds this fraction of x(t), the signal e(t) passes unchanged from block CNL and reaches the terminal $S_{out}$ of the canceller. Otherwise it is completely suppressed.

The filter FTR used in the canceller which is the object of the present invention is, as mentioned, a non-recursive filter (FIR) with adaptive coefficients, called hereinafter "transverse filter", whose transfer function has only zeroes. It is accomplished in direct form in accordance with known techniques for the design of digital filters. The filter comprises 48 taps corresponding to an equal number of coefficients, so that N=48. This value is adequate for simulation of only the significant part of the pulse response of the echo channel, which is approximately 6 ms.

The initial part of the echo channel pulse response, corresponding to a pure delay, is simulated by supplying to the input of the filter FTR voice samples x(t')

corresponding to the samples of the signal x(t) delayed by time t'=t−INDX.

The estimate signal $\hat{d}(t)$ is obtained by a convolution process between the pulse response of the filter FTR and the input x(t) in the manner indicated in the following formula.

$$\hat{d}(t) = \sum_{i=1}^{N} c_i \times (t' - i) \quad (1)$$

where $c_i$ indicates the adaptive coefficients of the transverse filter and x(t'−i) the delayed voice samples of the far-end talker.

The estimate of the echo signal $\hat{d}(t)$ can be expressed in a more compact manner using the following vectorial symbols:

$$\hat{d}(t) = \bar{C}_N^T(t) \bar{X}_N(t') \quad (2)$$

where $\bar{C}_N^T(t)$ is the transposition of the vector $\bar{C}_N(t)$ of the adaptive coefficients $c_i$, N being the number of adaptive coefficients and T the generic transposition operator; and $\bar{X}_N(t')$ is the vector of the transverse filter input signal, N being the number of voice samples x(t'−i).

Calculation of the vector $\bar{C}_N(t)$ is illustrated in detail below after illustrating the other cases of operation of the canceller.

The vectors $\bar{C}_N(t)$ and $\bar{X}_N(t')$ are so expressed:

$$C_N(t) = \begin{bmatrix} c_1 \\ c_2 \\ \cdot \\ \cdot \\ c_{N-1} \\ \cdot \\ \cdot \\ c_N \end{bmatrix} ; X_N(t') = \begin{bmatrix} x(t'-1) \\ x(t'-2) \\ \cdot \\ \cdot \\ x(t'-N+1) \\ \cdot \\ \cdot \\ x(t'-N) \end{bmatrix} \quad (3)$$

The above discussion shows clearly that if the filter FTR obtains a good estimate of the echo d(t) even in the presence of phase-roll, this echo will be effectively blanked at the output $S_{out}$ of the canceller, thus avoiding production of its bothersome effects on the far-end talker.

Now the other operating states of the echo canceller indicated above by X, Y and W will be discussed. The conditions which characterize these states are detected by block RDC which keeps under continuous observation the signals x(t) and d(t), comparing them appropriately. As concerns the operations which the different blocks of the canceller must undertake, state X (absence of the two talkers) and state Y (presence of only the near-end talker) are equivalent. Therefore it is sufficient that block RDC detects only the condition of absence of the far-end talker, which is common to the two states. Block RDC detects this condition by ascertaining that the signal x(t) is below a fixed threshold of −31 dBm.

The condition which characterizes state W (double talking) is detected by ascertaining that the difference between the signals x(t) and d(t) is less than 6 dB, assuming that the hybrid coil HIB attenuates the echo signal d(t) by at least 6 dB.

In the case of absence of the far-end talker, states X or Y, and in the presence of double talking, state W, the circuit RDC generates the signal INT which is directed to block CAC to disable the coefficient adaptation algorithm. Therefore in the presence of INT the vector of the coefficients $\bar{C}_N(t)$ is a constant vector, i.e. not updated. The reason for this disabling is that the signal e(t) used by block CAC could include the voice of the near-end talker.

The signal INT is directed also to blocks CIR and CNL. In block CIR it sets index j at value M of the iteration counter to convey the signal e(t) to block CNL. In the latter block the signal INT interrupts the silencing of the echo residual e'(t) to not cut off any voice of the near-end talker.

In states X and Y the output signal to the terminal $S_{out}$ coincides with the input signal to the terminal $S_{in}$. In state W the canceller continues to cancel the echo by estimating it and subtracting it from the input signal to the terminal $S_{in}$.

Now let us examine in greater detail the operation of the canceller in state A and in particular the adaptation algorithm of the coefficient vector of the transverse filter.

The coefficient adaptation algorithm was developed in an innovative manner starting from the known gradient method. A detailed description of the gradient method is supplied, for example, on pages 298 to 300 of the book entitled 'Digital Processing of Signals' by Maurice Bellanger published by John Wiley & Sons in 1984.

The criterion of coefficient optimization on which the gradient method is based is that of minimization of the mean square error of the power of the echo residual e(t).

The mean square error, indicated by $\epsilon(t)$, is expressed in the following manner:

$$\epsilon(t) = \sum_{n=1}^{t} [d(n) - \hat{d}(n)]^2 = \sum_{n=1}^{t} e^2(n) \quad (4)$$

where n is a discretized time variable increased with a cadence equal to $f_c$, and L is the generic sampling instant.

Minimization of the mean square error leads to a linear system of N equations in as many unknowns, in which the unknowns are the N coefficients of the transverse filter.

This system, represented in vectorial form, gives rise to a single vectorial equation known as the Wiener-Hopf equation. The solution of this equation is the vector $\bar{C}_N(t)$ obtained by multiplying an inverse self-correlation matrix of the input vector $\bar{X}_N(t')$ by a mutual correlation vector among N voice samples of the far-end talker and the respective echo samples.

To reduce the number of arithmetic operations, which are closely linked to the number N of filter coefficients, there are known algorithms which solve iteratively the Wiener-Hopf equation, avoiding solving the linear system of N equations.

One of these algorithms, known as the gradient method, is described in Bellanger's volume op cit. It assumes knowledge of the solution of the Wiener-Hopf equation at the instant preceding the existing one to find the solution at the existing instant by an appropriate correction of the previous coefficient vector in accordance with the following formula:

$$\bar{C}_N(t) = \bar{C}_N(t-1) + (\Delta/\sigma_x^2)\bar{X}_N(t)e(t) \quad (5)$$

where t is a discretized temporal variable increased with a rate equal to the sampling frequency $f_c = 8$ kHz; $\Delta$ is a constant value which appears in the correction term; $\sigma_x^2$ is the variance of the voice signal of the far-end talker.

Indicating by $c_i$ the terms of the vector $\bar{C}_N(t)$, for a generic coefficient $c_i$ is:

$$c_i(t) = c_i(t-1) + (\Delta/\sigma_x^2)x(t-i)e(t) \quad (5')$$

where $x(t-i)$ is the voice sample corresponding to the coefficient examined.

Calculating the coefficient $c_i$ by formula (5'), a generic i-th coefficient convergence time toward its actual value is rather long. Therefore a canceller using the gradient algorithm, as illustrated in the above mentioned volume, can be used only at the ends of the telephone lines having constant or slowly variable electric characteristics. It doesn't work well at the ends of telephone lines affected by high phase-roll.

To obviate this shortcoming, the innovative criterion defined above "error interpolation" has been introduced in the calculation of the adaptive coefficients. As mentioned above, the interpolation consists of iteratively updating the vector $\bar{C}_N(t)$ M times during a 125 µs frame, differently from the conventional gradient method which updates this vector only once for each frame. The formula which calculates the generic coefficient of the vector $\bar{C}_N(t)$ is as follows:

$$c_i(t,j) = c_i(t,j-1) + (\Delta/\sigma_x^2)x(t-i)e(t,j) \quad (6)$$

where i, t, $x(t-i)$, $\Delta$, $\sigma_x^2$ are defined in the above illustration of formula (5'); j is the index of the iteration counter zeroed with rate $f_c$ at the beginning of each interval t and increased with rate $M \cdot f_c$ during these intervals; $e(t,j)$ is the echo residual $d(t)$ calculated upon the j-th iteration. It is necessary to specify that in (6), in accordance with what was said above on the operation of block CIR, for $j=0$, $c_i(t,0) = c_i(t-1,M)$. Vectorially (6) becomes:

$$\bar{C}_N(t,j) = \bar{C}_N(t,j-1) + (\Delta/\sigma_x^2)\bar{X}_N(t)e(t,j) \quad (6')$$

The value $e(t,j)$, to be introduced for each iteration in (6') for calculation of $\bar{C}N(t,j)$, is obtained by calculating the echo estimated $d(t,j)$ by formula (2) applied to the j-th iteration in the course of execution and subtracting the echo estimated from the actual echo $d(t)$; more precisely: $e(t,j) = d(t) - d(t,j)$.

At the end of a generic interval t the value of the generic coefficient $c_i$ of formula (6) will be:

$$c_i(t,M) = c_i(t-1,M) + (\Delta/\sigma_x^2) \times (t-i) \sum_{j=1}^{M} e(t,j) \quad (6'')$$

where the summation in the last term originates from the interpolation of the error signal $e(t)$.

To complete the arithmetical operations expressed in formula (6'), block CAC includes the following circuits: a memory register which at the end of each updating iteration of the vector $\bar{C}_N(t)$ stores the updated value of this vector; a multiplier which multiplies the vector $\bar{X}_N(t)$ by $(\Delta/\sigma_x^2)e(t,j)$ obtaining a vectorial correction term coinciding with the second addend of (6'); and an adder which adds the content of the memory register (corresponding circuits of block CAC are timed by the signal $Mf_c$ and belong to the to the first addend of 6') with the vectorial correction term. The microprocessor which implements the canceller.

It is still useful to emphasize that, as can be seen from application of formulas (2, 6, 6', 6''), the interpolation concerns only the calculation of the adaptive coefficients. No interpolation is done on the voice signal of the far-end talker and on the echo signal. Indeed, at each increment in the variable t, which occurs every M increments of index j, the canceller CANC behaves in the following manner:

- block VET updates the input vectors $\bar{X}_N(t)$ and $\bar{X}_N(t')$ shifting one position the samples contained in the respective shift registers, with loss of the older samples $x(t-N)$ and $x(t'-N)$ and introduction of two respective present samples $x(t-1)$ and $x(t'-1)$;
- block SOT acquires a new echo sample $d(t)$ for calculation of the error $e(t,1)$ at the beginning of the new interpolation cycle; and
- block CIR places the echo residual sample $e(t,M)$ calculated during the last iteration $(j=M)$ at the disposal of block CNL for forwarding to the far-end talker.

As may be seen, input/output operations of samples to/from the canceller take place with rate $f_c$.

In formulas (6) and (6'') the variance $\sigma_x^2$ is obtained by squaring the term $\sigma_x$, known as standard deviation of the signal $x(t)$; $\sigma_x$ is in turn obtained by filtering the signal $|x(t)|$ by means of a digital filter of the first order included in block CAC. Normalization of the amplitude of the correction term to the value $\sigma_x^2$ makes the algorithm convergence time independent of the level of the voice signal of the far-end talker. The constant value $\Delta$ has a determinant effect on the speed of convergence of the calculation algorithm of the coefficients $c_i$. In (6') the value $\Delta = 1/N$ has been selected.

Comparing formulas (6'') and (5'), the latter relating to the gradient method, it may be seen that, in both formulas, the correction of the coefficient $c_i$ introduced altogether in a time t, comprises the same term $(\Delta/\sigma_x^2)x(t-i)$ which, in (6''), multiplies a summation extended to several error samples, while in (5') it multiplies a single error sample. It can be inferred that a generic coefficient $c_i$ calculated in the traditional manner in accordance with (5') employs M sampling intervals to reach that value, which (6''), thanks to the error interpolation, calculates in a single sampling interval. Consequently the convergence speed of the new algorithm for calculation of the coefficients of the transverse filter is increased by M times in comparison with that of the traditional gradient method.

The choice of an interpolation factor $M=3$ allowed compensation of a phase roll of 4 Hz and implementation of four cancellers using a single microprocessor of the above type.

Figure 2:
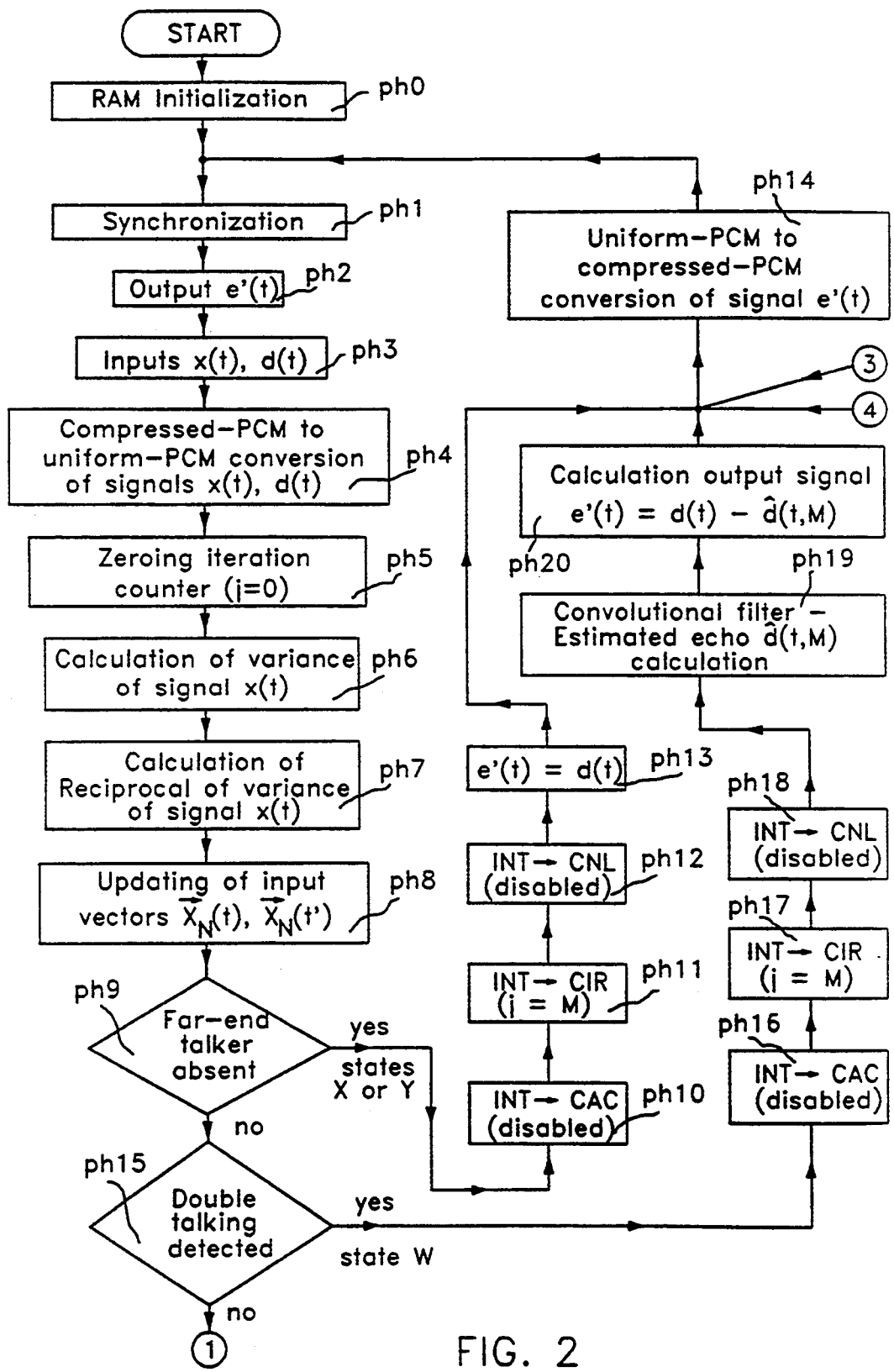
FIGS. 2, 3 and 4 are flowcharts of a microprocessor program implementing the canceller of FIG. 1.
Figure 3:
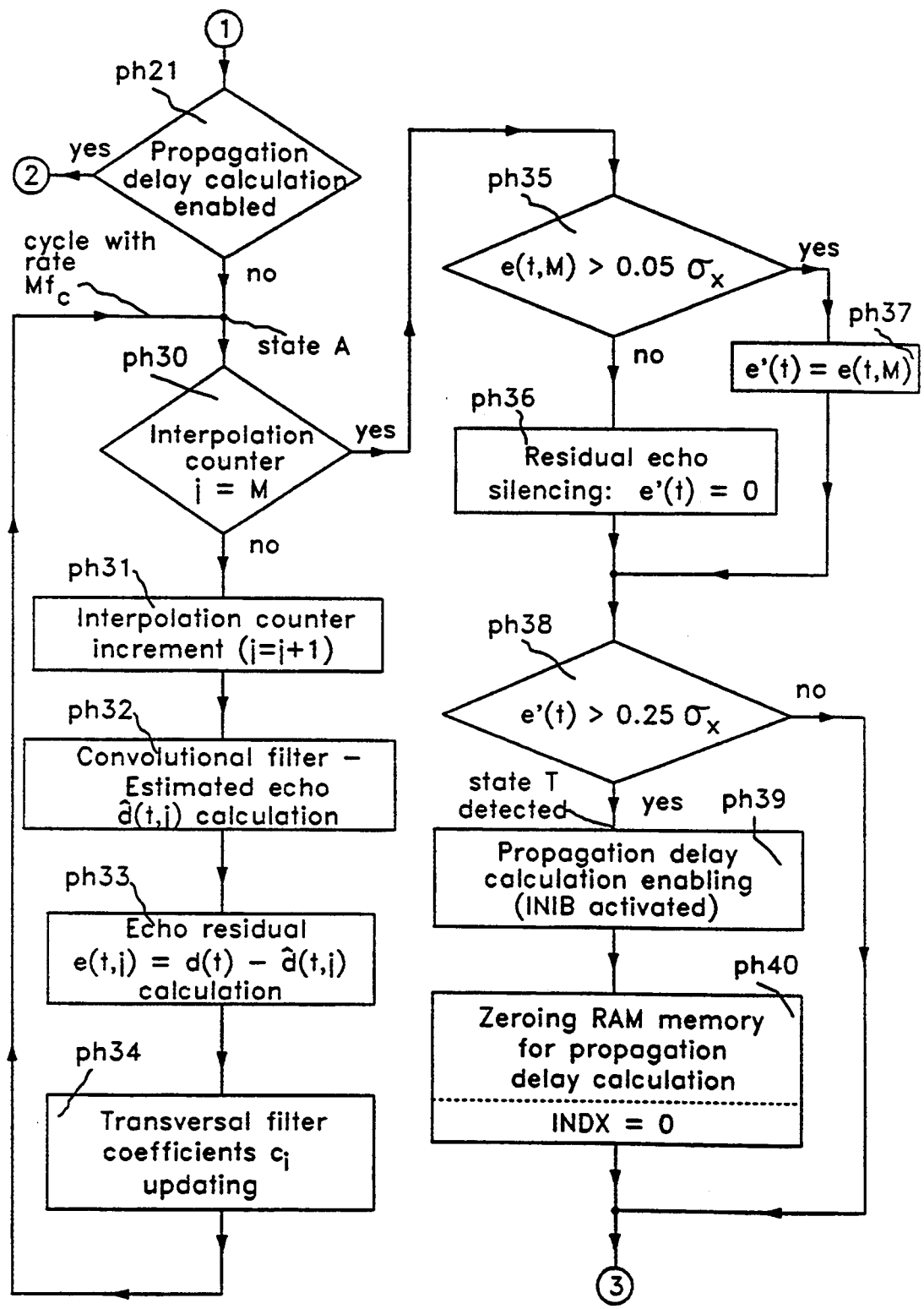
Figure 4:
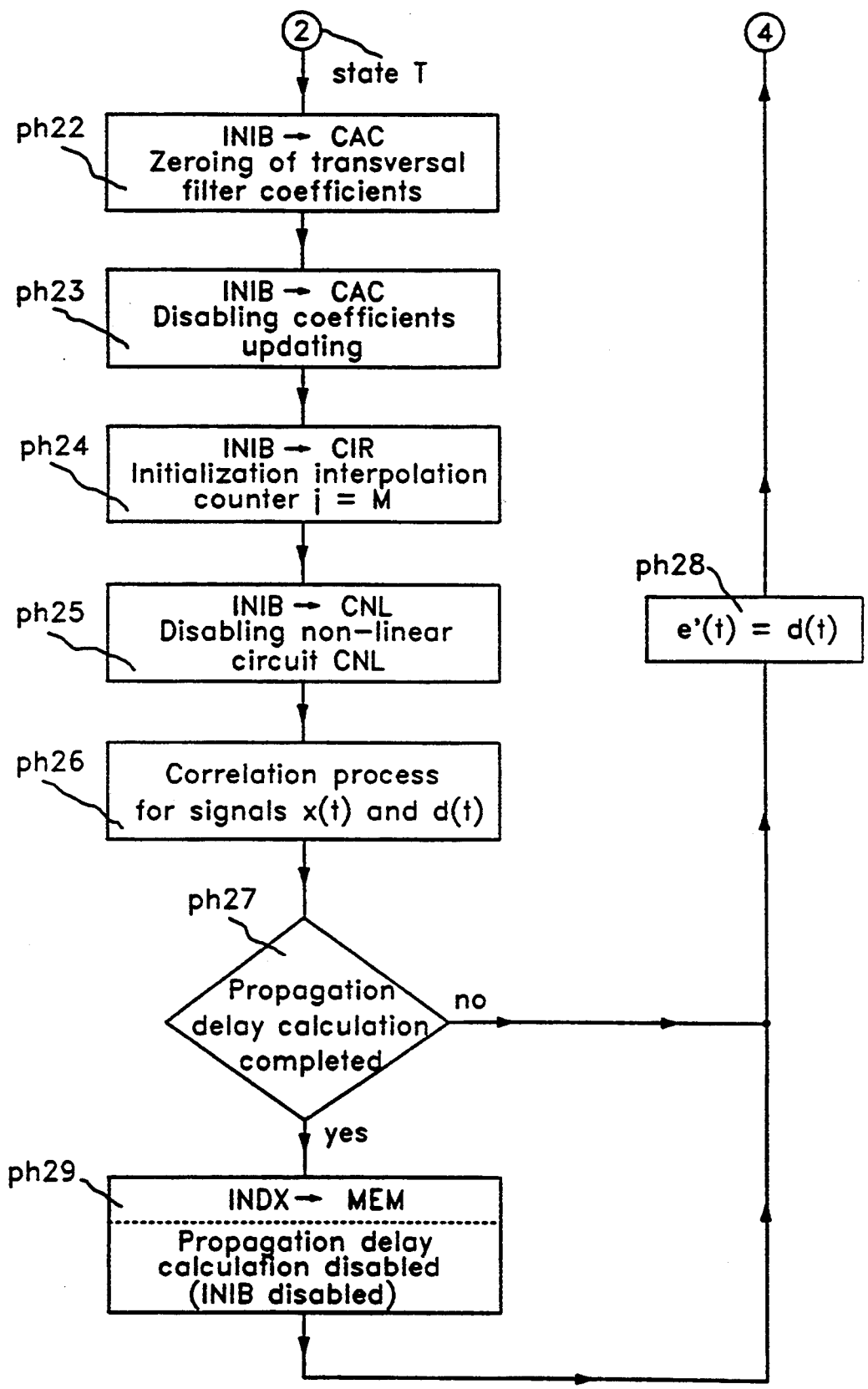

FIGS. 2, 3 and 4 show a flowchart of the sequence of operations carried out by the microprocessor, called hereinafter "unit", which implements the echo canceller of FIG. 1.

With reference to the above figures, in phase 0 (FIG. 2) are carried out some initialization operations of the random access memory (RAM) and of some registers of the microprocessor. The primary initializations are: zeroing of the register containing the index INDX which measures the echo propagation delay, and of the memory cells which act as delay elements in the calculation of the propagation delay; zeroing of the memory cells containing the transverse filter coefficients; zeroing of the memory cells which act as delay elements in the calculation of the standard deviation Gx, and writing of an appropriate initial value in the registers which store the succession of operating states T, A, W, X or Y of the canceller. Phase 0 is carried out only upon turning on the microprocessor or in some exceptional cases where it becomes necessary to reinitialize the device.

In phase 1, of synchronization, the unit waits for the two samples PCM x(t) and d(t) to be processed; the latter arrive at the terminals $R_{in}$ and $S_{in}$ respectively of the canceller.

Once the above samples have been acquired and stored in respective input registers, the unit continues with phase 2 in which it sends a residual echo sample e'(t) from an output register to the terminal $S_{out}$ of the canceller.

In the next phase 3 the samples x(t) and d(t) are transferred into two memory registers of the unit. The sample x(t) is also sent to the terminal $R_{out}$ of the canceller.

In phase 4 conversion of the signals x(t) and d(t) is carried out, codified in A-law 8 bit compressed PCM, into signals codified in 13 bits uniform PCM or linear form.

In phase 5 the unit zeroes index j of the iteration counter. In the next phase 6 the unit calculates the standard deviation $\sigma_x$ of the signal x(t) used in phase 7 for calculation of the reciprocal of the variance $1/\sigma_x^2$ of this signal.

In phase 8 the unit updates the input vector $\bar{X}_N(t)$ of the voice samples and that $\bar{X}_N(t')$ of the delayed voice samples, eliminating the samples x(t−N) and x(t'−N) from their respective vectors and shifting one position the remaining samples and inserting the samples x(t−1) and x(t'−1) to the head of the N−1 remaining voice samples of the far-end talker. If the propagation delay calculation has not yet been performed or completed, the result is INDX-O and consequently $\bar{X}_N(t')=\bar{X}_N(t)$.

In processing phase 9 the unit implements the functions performed by circuit RDC (FIG. 1). More precisely, in phase 9 the unit compares the voice signal of the far-end talker with a fixed threshold of level −31 dBmo to detect the absence of said far-end talker. This condition, if ascertained, leads to one of two possible operating states defined as X (absence of both talkers) or Y (presence of only the near-end talker), which are indistinguishable because the test is done only on the far-end talker's voice. For the entire duration of states X and Y there is activated the signal INT which will be used in subsequent processing.

In phase 10 the signal INT disables updating of the vector $\bar{C}_N(t)$ of the adaptive coefficients of the transverse filter.

In phase 11 the signal INT disables interpolation of the residual echo e(t), setting index j=M.

In phase 12 the signal INT disables the silencing function of the residual echo e'(t).

In the following phase 13 the sample e'(t), which can be either the voice of the near-end talker (state Y) or a very low level noise present at that moment on the line (state X), is introduced in the output register of the sample e'(t).

In the following phase 14 the sample e'(t) is converted from uniform PCM to compressed PCM. The unit then returns to synchronization phase 1, while waiting for two subsequent PCM samples x(t) and d(t) to be processed.

As can be seen, operational states X or Y of the canceller correspond to the repetitive cycle consisting of the phases included between 1 and 14.

If during performance of this repetitive cycle the voice of the far-end talker is detected in phase 9, the unit goes into phase 15 where it compares the signals x(t) and d(t) to verify the condition of double talking. As mentioned above, this condition is verified when the difference between x(t) and d(t) level is less than 6 dB, assuming that the hybrid coil HIB attenuates the echo signal d(t) by at least 6 dB. If this condition is verified, the unit goes into phase 16, which belongs to operational state W in which the signal INT is activated.

In phase 16 the signal INT disables updating of the vector $\bar{C}_N(t)$ of the adaptive coefficients of the transverse filter, freezing its pulsed response. It is necessary to specify that this freezing operation is done to allow the canceller to cancel the echo even under double talking conditions. However, the result is effectively achieved only in the absence of phase-roll. In the presence of a sustained phase-roll, there appears a sinusoidal modulation of the residual echo amplitude with frequency equal to the phase-roll.

In phase 17 the signal INT disables interpolation of the echo residue e(t) setting index j=M.

In phase 18 the signal INT disables the silencing function of the echo residual e'(t) to allow the voice of the near-end talker to reach the output terminal $S_{out}$ of the canceller.

In phase 19 the unit implements the digital filtering which produces the echo estimated d(t) as indicated in formula (2).

In phase 20 output signal e'(t) is calculated by subtracting echo estimate d(t) from signal d(t); the latter, in state W, represents the voice of the near-end talker plus the echo of the voice of the far-end talker. In the following phase 14 the sample e'(t) is converted from uniform PCM to compressed PCM. The unit returns then in synchronization phase 1 and waits for two new PCM samples x(t) and d(t) to be processed. In view of the above, operational state W of CANC corresponds to the repetitive cycle consisting of phases 1 to 9, 15 to 20, 14 and 1.

If, during performance of this repetitive cycle, in phase 15 the double talking condition is not verified, it means that the canceller CANC either is in steady state A or in the transitory phase which will take it to steady state A. The following phase 21 clarifies this dual possibility by completing a test of the presence of signal INIB. If signal INIB is present, it means that the canceller is in the transitory phase T in which it calculates the echo signal propagation delay; therefore the program jumps to phase 22, completing the repetitive cycle which characterizes operational state T. This cycle comprises phases 22 to 28, 14, 1 to 15 and 21. In phase 22 signal INIB zeroes vector $\bar{C}_N(t)$ of the adaptive coefficients of the transverse filter. In phase 23 signal INIB disables updating of vector $\bar{C}_N(t)$, inhibiting in formula (6) the sum of the correction term. In phase 24 the signal INIB disables the error interpolation process, setting index j of the iteration counter equal to M. In phase 25 the INIB signal disables the silencing function of the echo residual and therefore during the propagation delay calculation the actual echo d(t) is perceived by the far-end talker.

In the following phase 26 an interaction of the echo path delay calculation is completed. This calculation is performed by a digital correlation filter implemented by block RIT (FIG. 1) to whose input arrive the signals x(t) and d(t). The generic value $W_k(t)$ present at the output of the filter is given by the following formula:

$$W_k(t) = \rho x(t-k)d(t) + \alpha W_k(t-1) \quad (7)$$

where t is an index increased with rate equal to the sampling frequency $f_c = 8$ kHz; k is an index from 1 to 320, allowing correlation of each sample d(t) with all the 320 above samples of x(t); $\rho$ and $\alpha$ are constants linked to the characteristics of the digital filter, such as pass-band and band attenuation, and determine the accuracy of the calculation.

Index t, starting from a value $t_{iniz}$ which it has at the beginning of the delay calculation, is increased until it reaches the value $t_{iniz} + 320$, allowing extension of the correlation window to include a time interval of 40 ms.

At the end of the correlation process a value $W_k(t)_{max}$ is stored which is the maximum among the 320 values $W_k(t)$. In this manner the propagation delay INDX is identified and set equal to index k of $W_k(t)_{max}$.

In phase 27 is completed a test to verify whether the echo path delay calculation was completed. If the condition is not verified, the program performs phase 28 to produce the output sample e'(t). Thereafter is performed phase 14 returning to phase 1 for repetition of the cycle which characterizes state T. If the test of phase 27 shows that the delay calculation was completed, the program, before performing phase 28, jumps to phase 29 in which the value of INDX is stored and the signal INIB is removed, disabling the delay calculation starting with the next iteration.

When the program again enters phase 21, the condition of the signal INIB is no longer verified and therefore there is a jump to phase 30, which marks the beginning of a cycle which characterizes the steady state operation of the canceller in state A. This cycle includes phases 35, 36 or 37, 38, 14, 1 to 9, 15 and 21 and another cycle consisting of phases 30 to 34.

In phase 30 the processing unit checks if index j of the iteration counter has reached value M and, if this condition is confirmed, the program performs the test of phase 35 on the value of the echo residual e(t,M) averaged on a certain number of samples, ascertaining that this value is higher than a corresponding threshold 0.05 $\sigma_x$. If this condition is also verified the program jumps to phase 37 where the present echo residual sample e(t,M) is stored in the output register of the signal e'(t) ready to be converted into compressed PCM and sent to the terminal $S_{out}$ at the end of the cycle of state A. If the condition is not verified, the program jumps to phase 36 where it zeroes the register e'(t), causing in this manner silencing of the residual echo. As may be seen, the unit in phases 35 and 36 implements the non-linear circuit CNL (FIG. 1).

Both the phase 36 and 37 lead to phase 38 where there is performed another function of block RIT (FIG. 1) and specifically monitoring of the signal e'(t) at the output of the canceller CANC. In phase 38 is completed a test of the value of the residual echo e'(t) averaged on a certain number of samples, checking if this value is higher than a certain threshold corresponding to 0.25 $\sigma_x$. If this condition is verified, it means that the canceller is producing a bad echo cancellation, probably because of a variation in the echo path delay. It is therefore necessary to recalculate this delay. To this purpose, in phase 39 the unit activates the signal INIB in such a manner that, upon the next passage in the cycle, the test of phase 21 returns to the calculation of the propagation delay. The program continues with phase 40 where the unit zeroes the memory zones which contain INDX and the delay elements necessary for calculation of the mutual correlation of signals x(t) and d(t). The program then jumps to phase 14 where the echo residual sample e'(t), previously stored in the output register, is converted into compressed PCM and sent to the terminal $S_{out}$. If the condition of phase 38 is not verified, the echo path delay is not recalculated and the program jumps directly to phase 14. The unit then repeats the beginning part of the operation cycle in state A where, among the other operations, index j of the iteration counter is zeroed, and reaches phase 30 where it repeats the test of the value of index j. Since at this point of the program j=0, this test starts the cycle consisting of phases 30 to 34, corresponding to an iteration of the calculation in accordance with formulas (2) and (6) of a new sample of echo residual e(t,M) to be sent to the output.

More specifically, in phase 31 index j of the iteration counter is increased by one unit. In phase 32 is performed digital filtering which produces the estimated echo d(t,j) as indicated in formula (2) applied to the j-th iteration.

In phase 33 calculation of the error signal e(t,j) for the j-th iteration is performed; subtracting the estimated echo d(t,j) from the actual echo d(t).

In phase 34 the vector of the coefficients $\bar{C}_N(t)$ is updated, each coefficient being calculated in accordance with formula (6). The program then returns to phase 30 to complete another iteration of the calculation of e(t,M).

The calculation cycle 30 to 34 is repeated iteratively M times without interruption. Each iteration improves the evaluation of the vector $\bar{C}_N(t)$, reducing consequently the error e(t,j). In phase 30, upon occurrence of condition j=M, the cycle is not repeated and the sample e(t,M) is stored for subsequent processing of phase 35.

In view of the above, it is again useful to emphasize that the cycle consisting of phases 30 to 34 is iteratively repeated M times upon each acquisition of a new voice sample x(t) and actual echo d(t) by the canceller. The input/output operations of samples to/from the canceller take place at the sampling frequency $f_c = 8$ kHz and therefore the cycle 30 to 34 has a repetition frequency (rate) equal to M×8 kHz (24 kHz). The higher rate of this iterative cycle, a multiple of that with which the canceller acquires the voice and echo samples, together with the simplicity of the calculation algorithm of the vector $\bar{C}_N(t)$, allows repeated estimation of the echo sample during the interval of time between two following sample acquisitions by the canceller, obtaining upon each new estimate a value which approximates ever more closely that of the echo signal sample actually acquired.

From the above description of the functional blocks (FIG. 1) and the flowchart (FIGS. 2, 3 and 4) those skilled in the art can realize the microprogram governing operation of the above mentioned microprocessor used for implementation the echo canceller which is the object of the present invention.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A process for adaptive digital cancellation of an echo generated in telephone connections with electrical characteristics that vary rapidly in time, comprising the steps of:

estimating a pure propagation delay INDX between a voice signal x(t) of a far-end talker and an echo signal d(t) produced by reflection of said voice signal toward the far-end talker along an echo path, t being a temporal variable discretized at a sampling frequency of the voice and echo signals x(t) and d(t);

non-recursive digital filtering with adaptive coefficients ($c_i$) the voice samples of the far-end talker delayed by a value of said propagation delay INDX for generation of samples of an estimated signal d(t) of the echo signal d(t);

subtraction of said estimated signal d(t) from the echo signal d(t) to obtain an echo residual signal e(t) sent to the far-end talker without effects due to the echo signal d(t); iteratively updating said adaptive coefficients ($c_i$) by adding algebraically, upon each iteration, to a value of said adaptive coefficients in an immediately preceding iteration; calculating a correction term proportional to a value of the echo residual signal for a present iteration; and providing a frequency of the updating iterations of said adaptive coefficients ($c_i$) that has a value which is a multiple M of said sampling freuqncy.

2. The process for digital cancellation of the echo in accordance with claim 1, wherein said digital filtering is performed by multiplying a transposition of the vector $\bar{C}_N(t)$ having a number N of said adaptive coefficients ($c_i$) by an input vector $\bar{X}_N(t')$ having an identical number N of voice samples x(t') of the far-end talker delayed by said propagation delay INDX of the echo path, where t'=t−INDX.

3. The process for digital cancellation of the echo in accordance with claim 2, wherein said correction term which iteratively updates coefficients of the vector $\bar{C}_N(t)$ has the following expression: $(\Delta/\sigma_x^2) \bar{X}_N(t)e(t,j)$, where j is an index which is increased upon each iteration, e(t,j) is said residual echo signal e(t) calculated upon a j-th iteration, $\Delta = 1/N$ and $\sigma_x^2$ is the variance of the voice signal x(t).

4. The process for digital cancellation of the echo in accordance with claim 2, wherein upon each sampling period at the sampling frequency the input vector $\bar{X}_N(t')$ is updated, eliminating a sample x(t'−N) from a respective vector, shifting by one position remaining samples and inserting a sample x(t'−1) to a head of N−1 remaining voice samples of the far-end talker; and wherein there is also acquired a new echo signal d(t) for iterative calculation of the coefficient vector $\bar{C}_N(t)$, and wherein a residual echo signal e(t,M) calculated upon iteration of the present updating j=M is sent to the far-end talker.

5. The process for digital cancellation of the echo in accordance with claim 1, wherein said multiple M is an integer number equal to or greater than 2.

6. The process for digital cancellation of the echo in accordance with claim 1, wherein said propagation delay INDX of the echo path is calculated at the beginning of each new telephone connection between two subscribers thereof and later recalculated only when a level of said residual echo signal e(t) exceeds a threshold value.

7. An echo canceller for cancelling an echo generated in telephone connections with electrical characteristics that vary rapidly in time, comprising:

means for estimating a propagation delay INDX between a voice signal x(t) generated by a far-end talker and an echo signal d(t) produced by reflection of said voice signal toward the far-end talker along an echo path, t being a temporal variable discretized at a sampling frequency of the voice and echo signals x(t) and d(t);

means for generating an input vector $\bar{X}_N(t')$ having a number N of voice samples x(t') of the far-end talker, t' being equal to t−INDX;

means for generating an adaptive coefficient vector $\bar{C}_N(t)$ having coefficients ($c_i$), N being the number of said coefficients ($c_i$), and means for iteratively updating said coefficient vector by adding algebraically, upon each iteration, to a value which said coefficient vector had for a previous iteration an appropriate correction term proportional to a value of the echo residual signal calculated for a present iteration;

non-recursive digital filtering means for producing a sequence of samples of an estimated signal d(t) calculated by multiplying a transposition of the coefficient vector $\bar{C}_N(t)$ by said input vector $\bar{X}_N(t')$;

subtraction means for subtracting the samples of said estimated signal d(t) from samples of the echo signal d(t) to obtain samples of a echo residual signal e(t) sent to the far-end talker without the effects due to the echo signal d(t); and timing means for generating a timing signal having a frequency which is a multiple M of the sampling frequency, said timing signal controlling updating iterations of said coefficient vector $\bar{C}_N(t)$.

8. The echo canceller in accordance with claim 7, wherein said timing means for generating the timing signal has a counter of said updating iterations whose counting value corresponds to an index j increased by the timing signal and zeroed upon each sampling period to the sampling frequency, wherein for j=M said timer means sends a residual echo sample e(t,M) to the far-end talker, e(t,M) being the residual echo signal e(t) calculated upon the iteration corresponding to j=M.

9. The echo canceller in accordance with claim 7, wherein said means for generating the adaptive coefficient vector $\bar{C}_N(t)$ has:

a memory register, synchronized by said timing signal, which, at an end of each updating iteration of the coefficient vector $\bar{C}_N(t)$, stores an updated value of said coefficient vector;

a multiplier, synchronized by said timing signal, which multiplies said input vector $\bar{X}_N(t)$ by a multiplier term having the expression $(\Delta/\sigma_x^2)e(t,j)$, where e(t,j) is said residual echo signal e(t) calculated at a j-th iteration, $\Delta = 1/N$, and $\sigma_x^2$ is a variance of the voice signal x(t), said multiplier generating said correction term which iteratively updates the coefficient vector $\bar{C}_N(t)$;

an adder, synchronized by said timing signal, which adds a content of said memory register to said correction term, thereby updating said adaptive coefficient vector.

10. The echo canceller in accordance with claim 7, wherein said means for generating the input vector $\vec{X}_N(t')$ has a shift register of N memory cells containing said input vector, wherein a writing signal with the sampling frequency synchronizes the shifting of one position of a content of said cells thereby losing an oldest voice sample and introducing a new voice sample in said shift register.

11. The echo canceller in accordance with claim 7, wherein the echo canceller further comprises:

echo residual silencing means for comparing the echo residual signal e(t) with a first threshold value directly correlated with a level of the voice signal x(t), letting pass toward the far-end talker said echo residual signal e(t) only if the echo residual signal exceeds said first threshold value; and means for detecting simultaneous presence on a telephone line of voice signals of both a near-end talker and a far-end talker and, in case of double talking, said means for detecting generates a further signal which inhibits updating of the adaptive coefficient vector $\vec{C}_N(t)$ and silencing of the echo residual signal.

12. The echo canceller in accordance with claim 7, wherein said means for estimating the propagation delay INDX calculates said delay at a beginning of each new telephone connection between two subscribers thereof and recalculates said delay only when a level of said echo residual signal e(t) exceeds a second threshold value.

13. The echo canceller in accordance with claim 7, wherein said multiple M is an integer number equal to or greater than 2.

14. The echo canceller in accordance with claim 7, wherein said echo canceller is realized by means of a microprocessor.

15. The process in accordance with claim 1, wherein the steps of the process are executed by means of a microprocessor.

16. A process for adaptive digital cancellation of an echo generated in telephone connections with electrical characteristics that vary rapidly in time, comprising the steps of:

estimating a pure propagation delay INDX between a voice signal x(t) of a far-end talker and an echo signal d(t) produced by reflection of said voice signal toward the far-end talker along an echo path, t being a temporal variable discretized at a sampling frequency of the voice and echo signals x(t) and d(t);

non-recursive digital filtering with adaptive coefficients ($c_i$) by multiplying a transposition of a vector $\vec{C}_N(t)$ having a number N of adaptive coefficients ($c_i$) by an input vector $\vec{X}_N(t')$ having an identical number N of voice samples x(t') of the far-end talker delayed by said propagation delay INDX of the echo path, where t' = t − INDX, for generation of samples of an estimated signal d(t) of the echo signal d(t);

subtraction of said estimated signal d(t) from the echo signal d(t) to obtain an echo residual signal e(t) sent to the far-end talker without effects due to the echo signal d(t); iteratively updating said adaptive coefficients ($c_i$) by adding algebraically upon each iteration, to a value of said adaptive coefficients in an immediately preceding iteration; calculating a correction term proportional to a value of the echo residual signal for a present iteration; and providing a frequency of the updating iterations of said adaptive coefficients ($c_i$) that has a value which is a multiple M of said sampling frequency.

17. The process for digital cancellation of the echo in accordance with claim 16, wherein said correction term which iteratively updates coefficients of the vector $\vec{C}_N(t)$ has the following expression: $(\Delta/\sigma_x^2) \vec{X}_N(t) e(t,j)$, where j is an index which is increased upon each iteration, e(t,j) is said residual echo signal e(t) calculated upon a j-th iteration, $\Delta = 1/N$ and $\Delta_x^2$ is the variance of the voice signal x(t).

18. The process for digital cancellation of the echo in accordance with claim 16, wherein upon each sampling period at the sampling frequency the input vector $\vec{X}_N(t')$ is updated, eliminating a sample x(t' − N) from a respective vector, shifting by one position remaining samples and inserting a sample x(t' − 1) to a head of N − 1 remaining voice samples of the far-end talker; and wherein there is also acquired a new echo signal d(t) for iterative calculation of the coefficient vector $\vec{C}_N(t)$, and wherein a residual echo signal e(t,M) calculated upon iteration of the present updating j = M is sent to the far-end talker.

19. The process for digital cancellation of the echo in accordance with claim 16, wherein said multiple M is an integer number equal to or greater than 2.

20. The process for digital cancellation of the echo in accordance with claim 16, wherein said propagation delay INDX of the echo path is calculated at the beginning of each new telephone connection between two subscribers thereof and later recalculated only when a level of said residual echo signal e(t) exceeds a threshold value.

* * * * *